United States Patent
Phillips et al.

(10) Patent No.: US 11,971,167 B2
(45) Date of Patent: Apr. 30, 2024

(54) METHOD AND APPARATUS FOR FUEL VAPORISING IN CATALYTIC FUEL TANK INERTING

(71) Applicant: HS Marston Aerospace Limited, Wolverhampton (GB)

(72) Inventors: Paul Phillips, Bromsgrove (GB); Berwyn Pollard, Wolverhampton (GB)

(73) Assignee: HS MARSTON AEROSPACE LIMITED, Wolverhampton (GB)

(*) Notice: Subject to any disclaimer, the term of this patent is extended or adjusted under 35 U.S.C. 154(b) by 1113 days.

(21) Appl. No.: 16/007,037

(22) Filed: Jun. 13, 2018

(65) Prior Publication Data

US 2018/0356092 A1 Dec. 13, 2018

(30) Foreign Application Priority Data

Jun. 13, 2017 (EP) ..................................... 17175694

(51) Int. Cl.
  *F22B 3/02* (2006.01)
  *B01D 1/00* (2006.01)
  *B64D 37/32* (2006.01)
  *F24V 30/00* (2018.01)

(52) U.S. Cl.
  CPC .............. *F22B 3/02* (2013.01); *B01D 1/0017* (2013.01); *B64D 37/32* (2013.01); *F24V 30/00* (2018.05)

(58) Field of Classification Search
  None
  See application file for complete search history.

(56) References Cited

U.S. PATENT DOCUMENTS

| | | | |
|---|---|---|---|
| 2,719,583 A | 10/1955 | Malick | |
| 4,336,783 A | 6/1982 | Henson | |
| 6,330,907 B1* | 12/2001 | Ogushi | F28D 15/043 165/907 |
| 7,628,965 B2 | 12/2009 | Johnson et al. | |
| 7,694,916 B2 | 4/2010 | Limaye et al. | |
| 7,896,292 B2 | 3/2011 | Limaye et al. | |
| 7,905,259 B2 | 3/2011 | Johnson et al. | |
| 9,144,768 B2 | 9/2015 | Tichborne et al. | |
| 2004/0069242 A1* | 4/2004 | Welle | B01D 1/0041 122/13.3 |

(Continued)

FOREIGN PATENT DOCUMENTS

| | | |
|---|---|---|
| CA | 2475868 A1 | 1/2006 |
| EP | 3050612 A1 | 3/2016 |

(Continued)

OTHER PUBLICATIONS

Extended European Search Report for International Application No. 17175694.3 dated Nov. 8, 2017, 9 pages.

*Primary Examiner* — Elizabeth M Kerr
(74) *Attorney, Agent, or Firm* — CANTOR COLBURN LLP

(57) ABSTRACT

A device for evaporating a liquid such as liquid fuel. The device comprises: a shell; means for supplying heat to the shell; a porous wick located in the shell so that there is a gap between an outer surface side of the porous wick and an inner surface of the shell; means for supplying liquid to the porous wick; and an outlet in the shell for vapour produced in the gap by the application of heat from the shell to the liquid in the wick.

7 Claims, 4 Drawing Sheets

(56) References Cited

U.S. PATENT DOCUMENTS

| | | | |
|---|---|---|---|
| 2004/0151598 A1* | 8/2004 | Young | F04B 19/24 |
| | | | 417/208 |
| 2006/0011536 A1 | 1/2006 | Tashiro et al. | |
| 2007/0107879 A1* | 5/2007 | Radomski | A61M 16/18 |
| | | | 165/104.26 |
| 2008/0003132 A1 | 1/2008 | McGee et al. | |
| 2008/0128048 A1* | 6/2008 | Johnson | B64D 37/32 |
| | | | 141/59 |
| 2010/0037598 A1* | 2/2010 | Bruck | B01D 53/9409 |
| | | | 60/297 |
| 2011/0062288 A1* | 3/2011 | Cremers | B64D 13/06 |
| | | | 244/135 R |
| 2012/0279395 A1* | 11/2012 | K-Wlam | B64D 37/32 |
| | | | 244/135 R |
| 2017/0188626 A1* | 7/2017 | Davis | A24F 40/40 |

FOREIGN PATENT DOCUMENTS

| | | | | |
|---|---|---|---|---|
| EP | 3362361 B1 * | 3/2021 | | B01D 53/346 |
| WO | WO-2017064209 A2 * | 4/2017 | | A62C 3/065 |

* cited by examiner

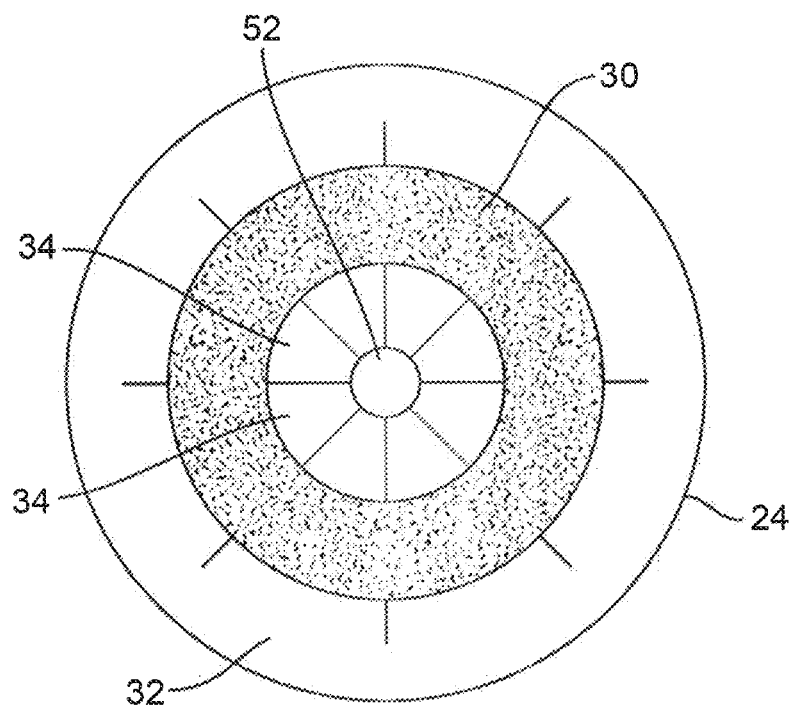

METHOD AND APPARATUS FOR FUEL VAPORISING IN CATALYTIC FUEL TANK INERTING

FOREIGN PRIORITY

This application claims priority to European Patent Application No. 17175694.3 filed Jun. 13, 2017, the entire contents of which is incorporated herein by reference.

TECHNICAL FIELD

The invention relates to a fuel tank inerting system for an aircraft, and more particularly to a method and apparatus for vaporising fuel for use in catalytic fuel tank inerting.

BACKGROUND

Fuel tank inerting systems (also called flammability reduction systems) are used on most commercial aircraft. They are used to provide an inert atmosphere to the ullage or header of a fuel tank in order to reduce the risk of fuel combustion and explosion.

Typically they employ air separation membrane technology. However, such known systems degrade over time and require significant levels of costly maintenance. An alternative system is a catalyst based fuel tank inerting system, where bleed-air-fed air separation modules and filter elements are replaced by a catalyst. Such a system requires fuel vapour to be mixed with oxygen and passed through a catalyst device, so that it can be converted into carbon dioxide ($CO_2$) and water ($H_2O$).

In order for this to happen, liquid fuel must to be vaporised in a safe and efficient manner. FIG. 1 shows a prior art fuel vaporiser 100, which uses an evaporator tank 102 with an electric heater 104 to produce the fuel vapour required for the catalyst process. A small amount of liquid fuel 106 is drawn from a fuel tank into the evaporator tank 102 and the heat from the electric heater 104 creates the fuel vapour 108. This fuel vapour 108 is then mixed with an oxygen-rich air source 110 (which may be bleed air), and passed through a catalyst device (not shown) so that it can be converted into carbon dioxide and water.

However, this prior art device is bulky, requires an electrical supply, requires maintenance, and is inefficient. Accordingly, an alternative is sought.

SUMMARY

According to a first aspect of the present invention, there is provided a device for evaporating a liquid such as liquid fuel, comprising: a shell; means for supplying heat to the shell; a porous wick located in the shell so that there is a gap between an outer surface side of the porous wick and an inner surface of the shell; means for supplying liquid to the porous wick; and an outlet in the shell for vapour produced in the gap by the application of heat from the shell to the liquid in the wick.

As this device has no moving parts, less maintenance is required. Further, the device can be made compact, and heat can be supplied without the need for a supply of electricity.

In a preferred form, the wick includes a primary porous wick facing the inner surface of the shell, and a secondary porous wick located within the primary porous wick, the liquid being supplied to the secondary porous wick.

It is possible to use a single wick; however, the provision of a primary porous wick and a secondary porous wick can ensure a desired distribution of the liquid, and is particularly useful during start-up of the evaporator.

In one form, the device is attached to a reservoir for liquid to be evaporated, the wick projecting into the reservoir so as to come into contact with the liquid. Preferably, the secondary porous wick projects into the reservoir and the primary porous wick does not project into the reservoir. This allows liquid to be supplied to the evaporator passively through the use of capillary action.

In an alternative form, means are provided to inject liquid into the wick.

Grooves may be formed on the outer surface of the wick for the transport of vapour along the wick.

The invention also extends to a method of evaporating a liquid such as liquid fuel, comprising the steps of: supplying the liquid to a porous wick located within a shell so that there is a gap between an outer surface side of the porous wick and an inner surface of the shell; supplying heat to the shell; and collecting the vapour produced in the gap by the application of heat from the shell to the liquid in the wick and removing said vapour from the shell.

Heat can be supplied to the shell by any suitable means. In one form, the heat is supplied to the shell by an electric heater, although this requires a supply of electricity.

In an alternative form, the heat is supplied to the shell by means of hot air circulating around the shell and/or within channels provided within the shell. The hot air can be taken from any suitable source, such as an engine supplied with the fuel. In a preferred form, the hot air is heated by heat obtained by an exothermic catalytic reaction between fuel vapour and oxygen.

BRIEF DESCRIPTION OF THE DRAWINGS

Preferred embodiments of the invention will now be described by way of example only and with reference to the accompanying drawings, in which:

FIG. 5 is a cross-sectional view of an evaporator.

DETAILED DESCRIPTION

In a method for the vaporising of liquid fuel for use in a catalyst-driven fuel tank inerting system, a loop pipe type evaporator takes a small amount of fuel from a fuel tank and vaporizes it into fuel vapour. The fuel vapour is then reacted with oxygen (in air) to produce carbon dioxide and water, and the carbon dioxide and water are transported to the inerting system to provide an inert atmosphere in the fuel tank.

Figure 1:
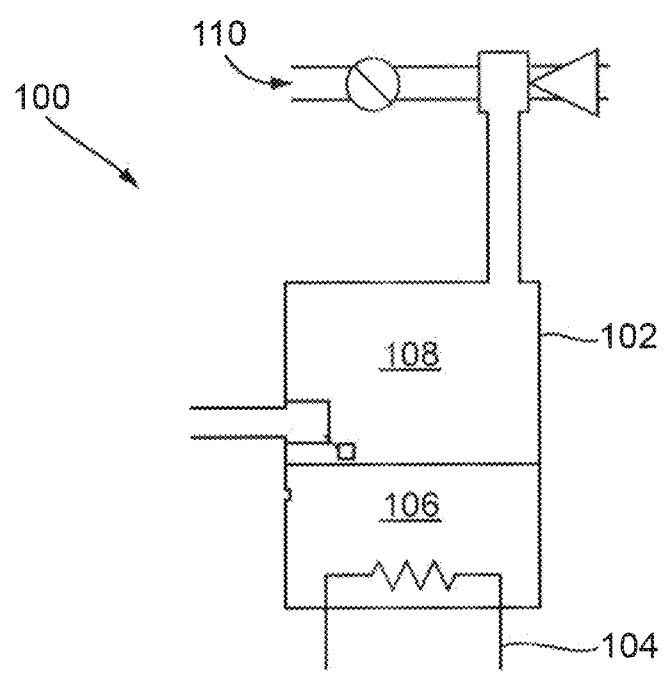
FIG. 1 is a schematic view of a prior art fuel vaporiser, including an electric heater and an evaporator tank.
Figure 2:
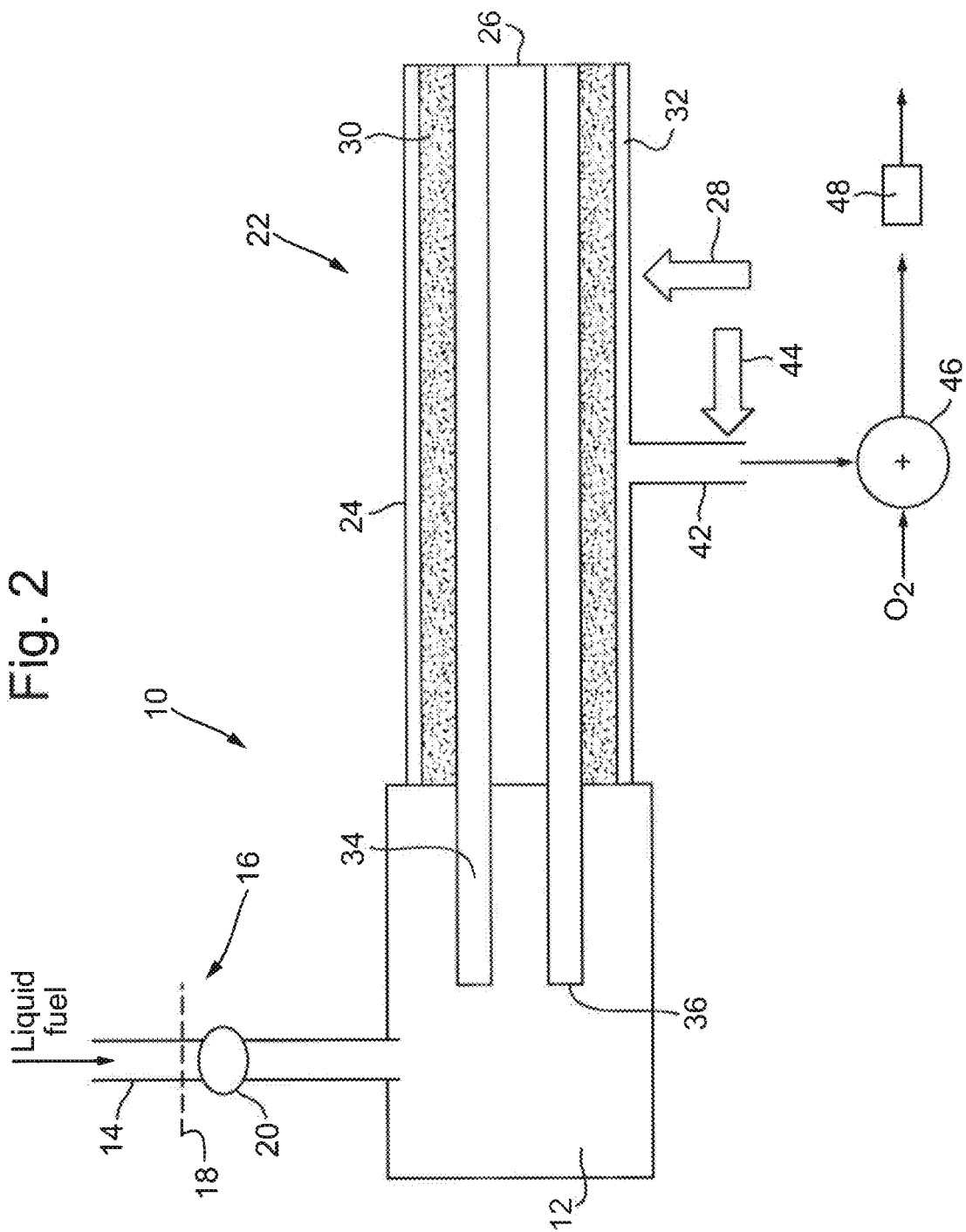
FIG. 2 is a view of a first embodiment of a fuel evaporator system according to the invention, with a fuel reservoir.

FIG. 2 shows one currently preferred form of an evaporator device.

The evaporator device 10 includes a liquid fuel reservoir 12 at one end. The reservoir is connected to the fuel tank, through a valve (not shown) which allows additional fuel to enter the reservoir from the fuel tank when the level of liquid fuel in the reservoir drops.

A pipe 14 leading from the valve to the reservoir includes a filter system 16 through which liquid fuel must pass before entering the reservoir 12. In the present embodiment, the filter system 16 consists of a filter screen 18 to remove large particulates, followed by a secondary filter 20 for smaller particulates, to ensure that the fuel will be clean when it enters the reservoir 12 of the evaporator device. Of course, other forms of filter may be used.

An evaporator body 22, in which the liquid fuel is turned into fuel vapour, projects from the reservoir 12. In the preferred embodiment, the evaporator body consists of a generally cylindrical shell 24, which is in liquid communication with the reservoir 12 at its proximal end and is closed at its distal end 26. Heat can be supplied to the shell, as indicated by arrow 28.

The shell contains a primary porous wick 30 in the form of an elongate annular body, the external diameter of which is slightly smaller than the internal diameter of the shell 24 so as to provide an annular space 32 between the primary porous wick 30 and the shell 24. A secondary porous wick 34, which is also in the form of an elongate annular body, is located radially within the primary porous wick 30. The external diameter of the secondary porous wick 34 is almost identical to the internal diameter of the primary porous wick 30, so that the secondary porous wick 34 fits snugly within the primary porous wick 30.

The proximal end 36 of the secondary porous wick 34 projects into the reservoir 12, and is contact with the liquid fuel in the reservoir 12. Capillary action will tend to draw the liquid fuel from the reservoir into the secondary porous wick 34, and from there into the primary porous wick 30 until the fuel reaches the radially outer surface of the primary porous wick 30.

At this radially outer surface 30, the heat supplied to the shell (indicated by arrow 28) causes the liquid to vaporise, to form fuel vapour.

Figure 4:
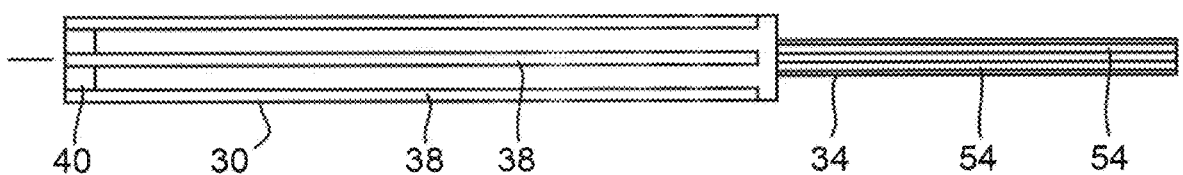
FIG. 4 is a detailed view of an evaporator wick, showing grooves form in an outer surface of the wick.

Longitudinal grooves 38 (best shown in FIG. 4) are formed along the length of the primary porous wick 30 (running from the proximal end to the distal end), and the fuel vapour tends to collect in these grooves 38 and move along the wick 30 to the distal end. A collection of smaller grooves 40 running perpendicular to the longitudinal axis of the primary porous wick 30 (and, when the evaporator is in its usual in-use orientation, vertically) allow the fuel vapour to be collected in a plenum and transported out of the shell via a vapour line 42. Longitudinal grooves 54 may also be formed along the length of the secondary porous wick 34, as shown in FIG. 4.

The vapour line 42 is a tube, which can also have a series of grooves on its inner surface to aid transport of the vapour. If necessary or appropriate, heat can also be supplied to the vapour line 42 to prevent the fuel vapour from condensing back into liquid after it has left the shell (as indicated by arrow 44). The fuel vapour can then be mixed in a mixer 46 with a source of oxygen, as required for the catalyst reaction. The oxygen source may be oxygen-rich air (such as bleed air) or may be pure oxygen. The mixture of fuel vapour and oxygen is passed through an appropriate catalytic device (shown highly schematically at 48) to produce carbon dioxide and water, and the carbon dioxide can be used as necessary for fuel tank inerting.

Pumps may be provided to draw both the oxygen source (the air) and fuel vapour through the system.

Heat may be supplied to the shell 24 by any convenient means. For example, a conventional electric heater may be located outside the shell 24 to supply heat to the shell. An electric heating element may be embedded in the shell 24. Heat may also be supplied by passing hot air through a network of embedded carbon nanotubes, or by directly applying hot air to the shell 24. The hot air could be bleed engine air, or air warmed with waste engine heat.

The reaction in the catalyst is exothermic; however, the catalytic reaction proceeds best at a specific temperature, and so it is normally necessary to cool the catalyst. This cooling means that there is already a hot air supply in the system, as a by-product of the process of cooling the catalyst, and so the waste heat from the catalyst can be used to heat the evaporator shell 24 and vaporise the fuel.

This hot air may be blown around the evaporator shell, guided via fins formed on the outer surface of the shell, and then ejected after it has transferred its heat to the fuel. If the air that is used to vaporise the fuel is sufficiently oxygen-rich, then it can be directly mixed with the fuel vapour at this stage, to provide the necessary mixture of air and fuel vapour, rather than supply air or oxygen from a separate source later in the inerting system.

Figure 3:
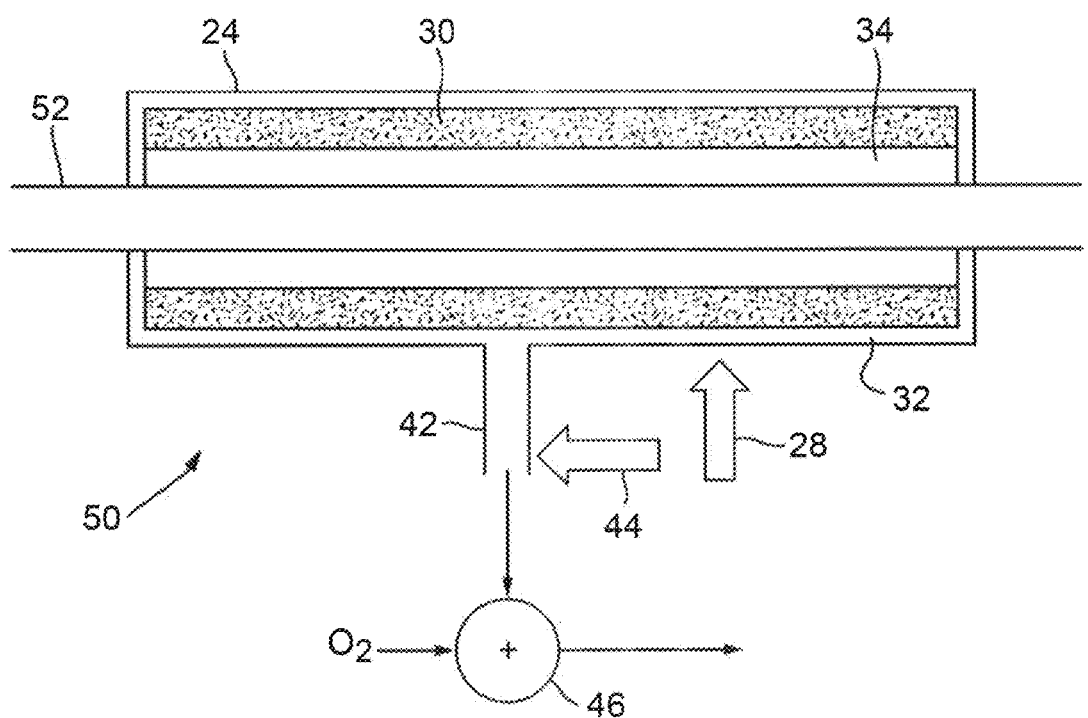
FIG. 3 is a view of a second embodiment of a fuel evaporator system according to the invention, in which fuel is injected into the evaporator.

An alternative form of evaporator, which does not use a fuel reservoir, is shown in FIG. 3. Parts of the evaporator system which correspond to parts already described with reference to FIG. 2 are indicated by the same reference numerals as in FIG. 2.

In the evaporator 50 shown in FIG. 3, the shell 24 is closed at both ends, and so forms a canister in which the primary porous wick 30 and the secondary porous wick 34 are accommodated. As in the embodiment in FIG. 2, the secondary porous wick 34 is located within the primary porous wick 30, and the radially outer surface of the primary porous wick 30 is spaced from the radially inner wall of the shell 24 to form an annular gap 32.

A fuel inlet line 52 runs the length of the shell 24, radially within the secondary porous wick 34. A fuel vapour line 42, which is in fluid communication with the annular gap 32, extends from the shell 24 to conduct fuel vapour away from the shell 24.

The fuel is injected into the evaporator 50 from the fuel inlet line 52 via a bayonet tube, or any other suitable means. This injection may only take place at one end of the shell 24, so that the fuel inlet line 52 enters the shell 24 at one end and terminates at the other end; alternatively, and as shown in FIG. 3, the fuel inlet line 52 may pass through the shell 24, and injection may take place at both ends of the shell 24 to provide an equal and consistent level of fuel in the evaporator 50.

In the embodiments of FIGS. 2 and 3, the shell is shown as cylindrical. The absence of corners on a cylindrical shell can help to avoid problems with thermal fatigue, and can aid the transfer of vapour within the shell. However, other shapes for the shell are possible, and it may be desirable to form the shell (and the wicks) into a shape other than cylindrical to aid with installation and the like.

Further, the embodiments of FIGS. 2 and 3 use a primary porous wick and a secondary porous wick. While it would be possible to use a single porous wick, this is not preferred, as the use of a primary porous wick and a secondary porous wick helps to stabilize the behaviour of the evaporator during start-up.

Behaviour during start-up of the evaporator can be unpredictable, particularly if there is not a sufficient amount of liquid in the evaporator wick. Providing a secondary wick helps to move liquid into the primary wick, to provide the correct distribution of liquid fuel in the evaporator to start the evaporation process.

As the evaporators described above remove the need for evaporation tanks in a fuel inerting catalyst system, the system overall can be made more compact, and requires less maintenance. Further, it allows a more efficient and reduced fuel inerting system envelope, so that the system can be installed with more flexibility.

The invention claimed is:

1. A fuel tank inerting system, comprising:
   a fuel tank;
   a device for evaporating liquid fuel received from the fuel tank;
   a catalytic device comprising a catalyst for combusting oxygen and fuel vapour and for supplying a product of the combusted fuel vapour to the fuel tank,
      wherein the device for evaporating liquid fuel comprises:
      a shell;
      a porous wick located in the shell so that there is a gap between an outer surface side of the porous wick and an inner surface of the shell;
      means for supplying liquid fuel to the porous wick; and
      an outlet in the shell for fuel vapour produced in the gap by application of heat from the shell to the liquid fuel in the wick, wherein the fuel vapor is directed from the outlet to a catalytic device,
      wherein the wick includes a primary porous wick facing the inner surface of the shell, and a secondary porous wick located within the primary porous wick, the liquid fuel being supplied to the secondary porous wick, then from the secondary porous wick into the primary porous wick, so that the fuel vapour is produced in the gap between the porous wick and the shell by the application of heat from the shell to the liquid fuel in the primary porous wick,
   the fuel tank inerting system comprising a means for supplying the heat to the shell of the device for evaporating liquid fuel, wherein the means for supplying the heat comprises a hot air supply obtained by cooling the catalyst of the catalytic device.

2. A fuel tank inerting system as claimed in claim 1, wherein the device for evaporating liquid fuel is attached to a reservoir for liquid fuel to be evaporated, the wick projecting into the reservoir so as to come into contact with the liquid fuel.

3. A fuel tank inerting system as claimed in claim 2, wherein the secondary porous wick projects into the reservoir and the primary porous wick does not project into the reservoir.

4. A fuel tank inerting system as claimed in claim 1, wherein means are provided to inject liquid fuel into the wick.

5. A fuel tank inerting system as claimed in claim 1, wherein grooves are formed on the outer surface of the wick for the transport of fuel vapour along the wick.

6. A method of fuel tank inerting, comprising:
   supplying liquid fuel from a fuel tank to a porous wick located within a shell so that there is a gap between an outer surface side of the porous wick and an inner surface of the shell;
   supplying heat to the shell;
   evaporating liquid fuel in the wick to produce fuel vapour in the gap by the application of heat from the shell to the liquid fuel in the wick;
   collecting the fuel vapour produced in the gap and removing said vapour from the shell;
   directing said vapour to a catalytic device comprising a catalyst for combusting the fuel vapor and oxygen; and
   directing a product of the combusted fuel to the fuel tank,
   wherein the wick includes a primary porous wick facing the inner surface of the shell, and a secondary porous wick located within the primary porous wick, the liquid fuel being supplied to the secondary porous wick, then from the secondary porous wick into the primary porous wick, so that the fuel vapour is produced in the gap between the porous wick and the shell by the application of heat from the shell to the liquid fuel in the primary porous wick,
   wherein heat is supplied to the shell via a hot air supply obtained by cooling the catalyst.

7. A method as claimed in claim 6, wherein the heat is supplied to the shell by means of hot air circulating around the shell or within channels provided within the shell.

* * * * *